United States Patent
Lee et al.

(10) Patent No.: US 8,654,882 B2
(45) Date of Patent: Feb. 18, 2014

(54) METHOD AND APPARATUS OF DETECTING SIGNAL BASED ON MINIMUM MEAN SQUARE ERROR IN MULTIPLE INPUT MULTIPLE OUTPUT SYSTEM

(75) Inventors: Hoon Lee, Daejeon-si (KR); Young Jo Bang, Daejeon-si (KR); Seungjae Bang, Daejeon-si (KR); Jung Pil Choi, Daejeon-si (KR); Youn Ok Park, Daejeon-si (KR); Jae Kwon Kim, Daejeon-si (KR); Nulibyul Kim, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 0 days.

(21) Appl. No.: 13/453,464

(22) Filed: Apr. 23, 2012

(65) Prior Publication Data

US 2012/0269248 A1  Oct. 25, 2012

(30) Foreign Application Priority Data

Apr. 22, 2011 (KR) .................. 10-2011-0037607

(51) Int. Cl.
*H04B 7/02* (2006.01)
*H04L 1/02* (2006.01)
*H04L 27/06* (2006.01)

(52) U.S. Cl.
USPC ............................... 375/267; 375/341

(58) Field of Classification Search
USPC .......... 375/267, 224, 341, 260, 259, 340, 316
See application file for complete search history.

(56) References Cited

U.S. PATENT DOCUMENTS

| 7,616,699 B2 | 11/2009 | Niu et al. | |
| 2007/0280367 A1* | 12/2007 | Nakao et al. | 375/260 |
| 2008/0273618 A1* | 11/2008 | Forenza et al. | 375/261 |
| 2010/0317292 A1* | 12/2010 | Takatani et al. | 455/63.1 |

* cited by examiner

*Primary Examiner* — Chieh M Fan
*Assistant Examiner* — Brian J Stevens
(74) *Attorney, Agent, or Firm* — Rabin & Berdo, P.C.

(57) ABSTRACT

A receiver in a multiple-input multiple-output (MIMO) system is provided. The receiver includes a channel estimator estimating a channel based on a receiving signal, a minimum mean square error (MMSE) based reciprocal log likelihood ratio (R-LLR) calculator connected with the channel estimator and calculating an R-LLR based on the receiving signal and the estimated channel, and a channel decoder connected with the MMSE based R-LLR calculator and decoding the channel and the receiving signal based on the calculated R-LLR, wherein the R-LLR is calculated based on the reciprocity.

14 Claims, 10 Drawing Sheets

METHOD AND APPARATUS OF DETECTING SIGNAL BASED ON MINIMUM MEAN SQUARE ERROR IN MULTIPLE INPUT MULTIPLE OUTPUT SYSTEM

CROSS-REFERENCE TO RELATED APPLICATIONS

This application claims the benefit of priority of Korean Patent application No. 10-2011-0037607 filed on Apr. 22, 2011, which is incorporated by reference.

BACKGROUND OF THE INVENTION

1. Field of the Invention

The present invention relates to wireless communications, and more particularly, to a method and an apparatus of detecting a signal based on a minimum mean square error (MMSE) in a multiple-input multiple-output (MIMO) system.

2. Related Art

A multiple-input multiple-output (MIMO) technology may be applied to a wireless communication system so as to satisfy fast data transmission that is a requirement of a next-generation mobile communication system. The MIMO technology increases channel capacity by using a multiple transmit antenna and a multiple receive antenna without using an additional frequency or transmission power. Further, the MIMO technology can be easily coupled with an orthogonal frequency division multiplexing (OFDM) technology strong against multi path fading. An example of technologies for implementing diversity in the MIMO system may include space frequency block code (SFBC), space time block code (STBC), cyclic delay diversity (CDD), frequency switched transmit diversity (FSTD), time switched transmit diversity (TSTD), precoding vector switching (PVS), spatial multiplexing (SM), or the like. A MIMO channel matrix according to the number of receive antennas and the number of transmit antennas may be decomposed into a plurality of independent channels. Each independent channel may be referred to as a layer or a stream. The number of layers is referred to as a rank.

The MIMO system can improve the channel capacity and the transmitting and receiving efficiency but has a problem of having a plurality of antennas mounted therein. The plurality of antennas may be easily mounted in a base station that can implement relatively complex hardware, but it is not easy to implement a plurality of radio frequency chains in a small user equipment in connection with a size and a cost. Therefore, most of the wireless communication systems to which the MIMO system is applied have two spatial streams.

A receive signal may be detected by calculating a minimum mean square error (MMSE) based log likelihood ratio in the MIMO system having the two spatial streams. A method of calculating MMSE based LLR according to the related art has a small amount of calculations, but when transmit probabilities of all the transmit symbols are the same, has performance lower than a method of calculating optimal LLR capable of achieving the optimal performance.

Therefore, a need exists for a method of calculating LLR based on new MMSE so as to improve reliability of MMSE based LLR calculation.

SUMMARY OF THE INVENTION

The present invention provides a method and an apparatus of detecting a signal based on a minimum mean square error (MMSE) in a multiple-input multiple-output (MIMO) system.

In an aspect, a receiver in a multiple-input multiple-output (MIMO) system is provided. The receiver includes a channel estimator configured for estimating a channel based on a receive signal, a minimum mean square error (MMSE) based reciprocal log likelihood ratio (R-LLR) calculator, coupled to the channel estimator, and configured for calculating an R-LLR based on the receive signal and the estimated channel; and a channel decoder, coupled to the MMSE based R-LLR calculator, and configured for decoding the channel and the receive signal based on the calculated R-LLR, wherein the R-LLR is calculated based on the reciprocity.

In another aspect, a method of detecting a signal in a multi-input multiple-output (MIMO) system is provided. The method includes estimating a channel based on a receive signal, calculating a reciprocal log likelihood ratio (R-LLR) based on the receive signal and the estimated channel, and decoding the channel and the receive signal based the calculated R-LLR, wherein the R-LLR is calculated based on reciprocity.

DESCRIPTION OF EXEMPLARY EMBODIMENTS

Figure 1:
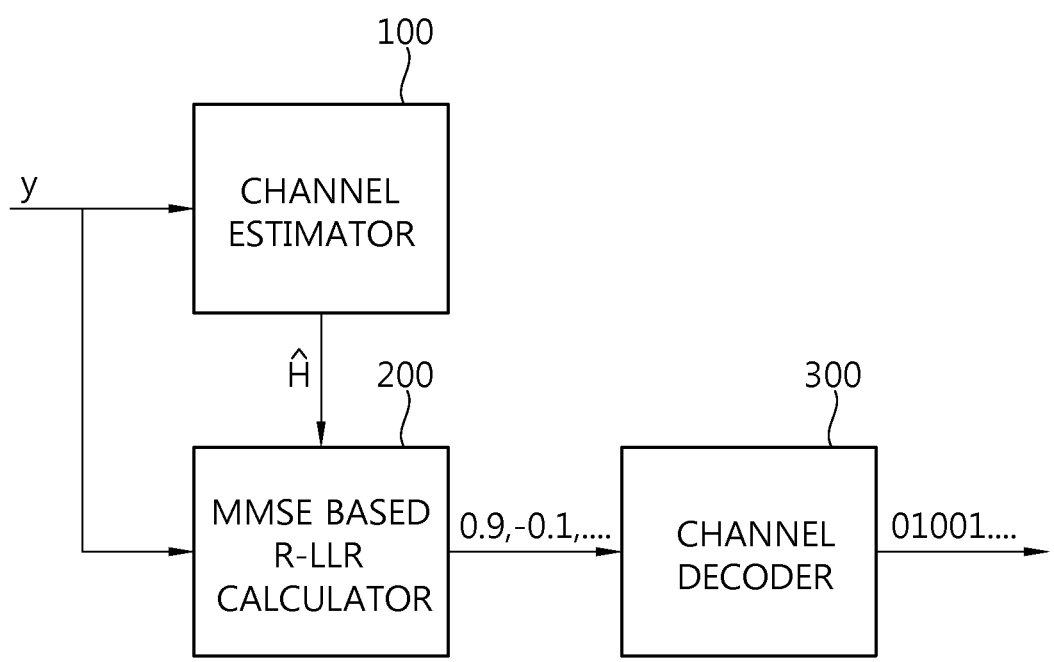
FIG. 1 is a block diagram of a receiver to which the present invention is applied.

Hereinafter, exemplary embodiments of the present invention will be described in detail with reference to the accompanying drawings so that those skilled in the art may easily practice the present invention. However, the present invention may be modified in various different ways and is not limited to the exemplary embodiments provided in the present description. In the accompanying drawings, portions unrelated to the description will be omitted in order to obviously describe the present invention, and similar reference numerals will be used to describe similar portions throughout the present specification. Further, when a detailed description is omitted, only a detailed description of portions that may be easily understood by those skilled in the art will be omitted.

Through the present specification and claims, unless explicitly described otherwise, "comprising" any components will be understood to imply the inclusion of other components rather than the exclusion of any other components.

FIG. 1 is a block diagram of a receiver to which the present invention is applied.

Referring to FIG. 1, a receiver includes a channel estimator 100, a minimum mean square error (MMSE) based reciprocal-log likelihood ration (R-LLR) calculator 200, and a channel decoder 300. The channel estimator 100 estimates a channel based on a receive signal y. The MMSE based R-LLR calculator calculates an R-LLR based on the receive signal and the estimated channel. The channel decoder 300 decodes the channel and the receive signal based on the calculated R-LLR.

Hereinafter, an operation of the MMSE based R-LLR calculator of FIG. 1 will be described in detail.

In the following description, a thick alphabet small letter represents a vector and a thick alphabet capital represents a matrix. Elements of a vector or a matrix are represented by an italic small letter and a position of each element is represented using a subscript. $CN(0, \sigma2)$ represents a circular symmetric Gaussian distribution in which a mean is 0 and dispersion is $\sigma2$. $[\bullet]^T$ represents a transpose of a vector or a matrix and $[\bullet]^H$ represents a conjugated transpose of a vector or a matrix. For vector $y=[y_1\ y_2\ \ldots\ y_n]$, $//y//$ represents $l^2$ norm and $|\bullet|$ represents an absolute value of a complex point. For two sets, $\{\bullet\}/\{\bullet\}$ represent a subtraction operation of a set. For example, $\{a,b,c\}/\{a\}=\{b,c\}$. $\Omega$ represents a set of complex constellation points and $|\Omega|$ represents the number of constellation points.

The exemplary embodiment of the present invention considers a wireless communication channel configured to include two transmit antennas and $n_R$ receive antennas. Equation 1 represents a relationship between the transmit signal and the receive signal.

$$y = Hx + z$$
$$y = [y_1\ y_2\ \cdots\ y_{n_R}]^T$$
$$x = [x_1\ x_2]^T$$
$$z = [z_1\ z_2\ \cdots\ z_{n_R}]^T$$
$$H = \begin{bmatrix} h_{11} & h_{12} \\ h_{21} & h_{22} \\ \vdots & \vdots \\ h_{n_R 1} & h_{n_R 2} \end{bmatrix}$$

[Equation 1]

In Equation 1, y is a receive signal vector, x is a transmit signal vector, z represents a noise vector, and H is a channel gain matrix. $x_i$ (i=1,2) represent a signal transmitted from i-th transmit antenna and $y_j$ (j=1, 2, ..., $n_R$) represents a signal received to a j-th receive antenna. $h_{ji}$ (j=1, 2, ..., $n_R$, i=1,2) represents a channel gain between an i-th transmit antenna and a j-th receive antenna. Noise $z_j \sim CN(0,\sigma_z2)$ (j=1, 2, ..., $n_R$) is assumed to be circular symmetric white Gaussian noise. Further, the transmit signal $x_i$ (i=1, 2) is assumed to be symbols modulated by a $|\Omega|$-quadrature amplitude modulation ($|\Omega|$-QAM) scheme.

In order to calculate the MMSE based R-LLR, the MMSE based LLR is first calculated.

Equation 1 may be modified like Equation 2.

$$y = h_1 x_1 + h_2 x_2 + z \quad \text{[Equation 2]}$$

Where $h_i=[h_{1i}\ h_{2i}\ \ldots\ h_{n_R i}]^T$ (i=1,2) represents the i-th column of the channel gain matrix H.

The MMSE solution $\tilde{x}_{1,MMSE}$ for a first stream based on Equation 2 may be represented by the following Equation 3.

$$\tilde{x}_{1,MMSE} = w_1 y \quad \text{[Equation 3]}$$
$$= w_1 h_1 x_1 + w_1 h_2 x_2 + w_1 z$$
$$= \rho x_1 + I_1 + z_1'$$
$$\approx x_1 + z_1''$$

In Equation 3, $w_1=[w_{11}\ w_{12}\ \ldots\ w_{1n_R}]$ represents a first row vector of a MMSE filter. If it is assumed that $z_1''$ represented by a sum of interference component $I_1$ and noise $z_1'$ for the first stream is the circular symmetric white Gaussian noise and the $\tilde{x}_{1,MMSE}$ and $\tilde{x}_{2,MMSE}$ that are the MMSE solution for each stream are independent from each other, a probability density function of a conditional probability where $\tilde{x}_{1,MMSE}$ will be detected may be represented by Equation 4 when transmitting x1.

$$P(\tilde{x}_{1,MMSE}\mid x_1) = \frac{1}{\sqrt{2\pi\sigma_1^2}}\exp\left(-\frac{|\tilde{x}_{1,MMSE} - x_1|^2}{2\sigma_1^2}\right) \quad \text{[Equation 4]}$$

The LLR function for a k-th bit of the first stream may be represented by Equation 5 under the assumption that the transmit probability of all the transmit symbols are the same based on Equation 4.

$$LLR(b_{k,1}) = \ln\frac{\sum_{x_i \in S_k^+} p(x_i \mid \tilde{x}_{1,MMSE})}{\sum_{x_j \in S_k^-} p(x_j \mid \tilde{x}_{1,MMSE})} \quad \text{[Equation 5]}$$
$$= \ln\frac{\sum_{x_i \in S_k^+} p(\tilde{x}_{1,MMSE} \mid x_i)p(x_i)}{\sum_{x_j \in S_k^-} p(\tilde{x}_{1,MMSE} \mid x_j)p(x_j)}$$
$$= \ln\frac{\sum_{x_i \in S_k^+} p(\tilde{x}_{1,MMSE} \mid x_i)}{\sum_{x_j \in S_k^-} p(\tilde{x}_{1,MMSE} \mid x_j)}$$

Where $b_{k,1}$ represents the k-th bit of the first stream, $S_k^+$ represents the symbol set of which the k-th bit is 1, and $S_k^-$ represents the symbol set of which the k-th bit is 0.

Equation 6 may be obtained by performing Max-log approximation for Equation 5.

$$LLR(b_{k,1}) \approx \ln\frac{\max_{x_i \in S_k^+} p(\tilde{x}_{1,MMSE} \mid x_i)}{\max_{x_j \in S_k^-} p(\tilde{x}_{1,MMSE} \mid x_j)} \quad \text{[Equation 6]}$$
$$= \frac{1}{2\sigma_1^2}(|\tilde{x}_{1,MMSE} - x_{1,k,-}^{opt}|^2 - |\tilde{x}_{1,MMSE} - x_{1,k,+}^{opt}|^2)$$

In Equation 6, $$x_{1,k,+}^{opt} = \arg\min_{x \in S_k^+}\left|\tilde{x}_{1,MMSE} - x\right|^2,$$

-continued $$x_{1,k,-}^{opt} = \arg\min_{x \in S_k^-} \left| \tilde{x}_{1,MMSE} - x \right|^2, \text{ and}$$

$$\sigma_1^2 = E[|I_1 + z_1'|^2] \approx E[|I_1|^2] + E[|z_1'|^2] = E_x |w_1 h_1|^2 + \sigma_z^2 \|w_1\|^2.$$

Equation 6 is the LLR function in the case in which a signal-to-interference noise ratio (SINR) of each stream is different. When the noise power of each stream is the same, the channel decoder outputs the same results by multiplying the same weight by each stream and therefore, may be modified like Equation 6 and Equation 7.

$$\text{LLR}(b_{k,i}) = |\tilde{x}_{i,MMSE} - x_{i,k,-}^{opt}|^2 - |\tilde{x}_{i,MMSE} - x_{i,k,+}^{opt}|^2 \quad \text{[Equation 7]}$$

That is, in Equation 7, the LLR may be calculate by a difference in a square of an Euclidean distance between $x_{1,1,-}^{opt}$ and $x_{1,1,+}^{opt}$ for the estimated transmit symbol $\tilde{x}_{1,MMSE} = \tilde{x}_R + j\tilde{x}_I$.

Figure 2:
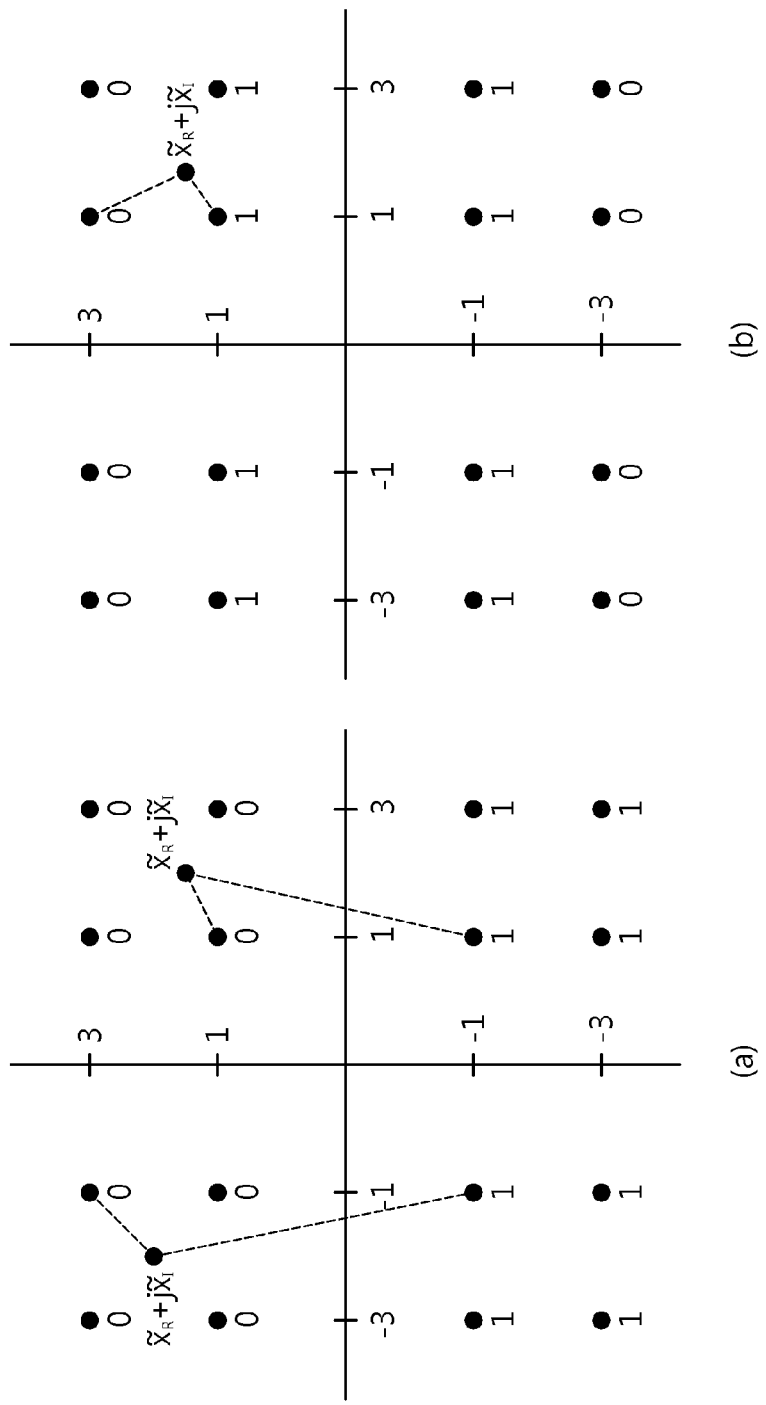
FIGS. 2 and 3 are diagrams showing that an LLR for each bit is generated through constellation points when a 16 QAM modulation scheme is used.
Figure 3:
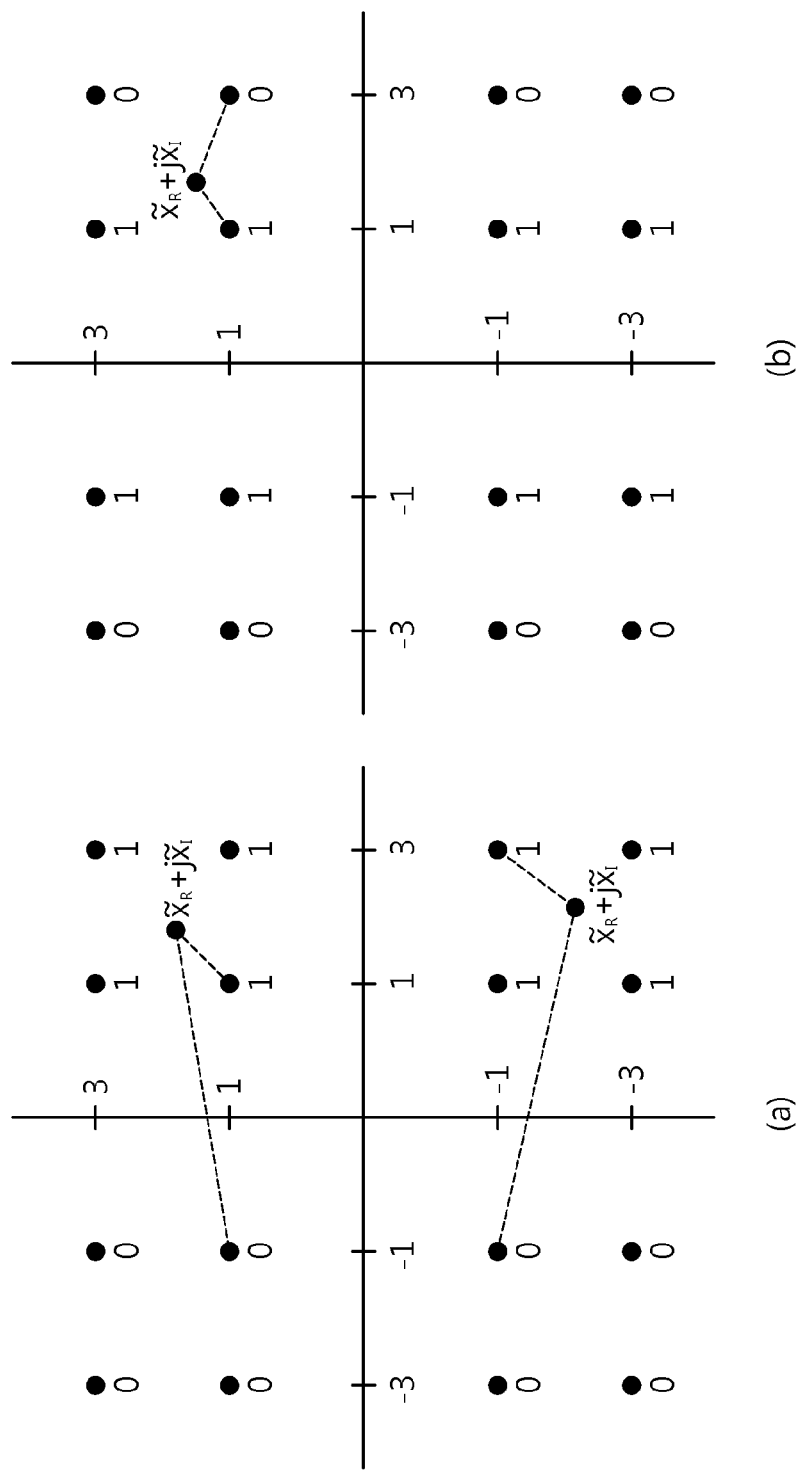

FIGS. 2 and 3 are diagrams showing that an LLR for each bit is generated through constellation points when a 16 QAM modulation scheme is used. FIG. 2 shows that the LLR for the first and second bits are generated and FIG. 3 shows that the LLR for the third and fourth bits are generated.

When using the constellation points in the form as shown in FIGS. 2 and 3, the LLR for each bit may be calculated by Equations 8 to 11. Equation 8 is an equation of calculating the LLR for the first bit, Equation 9 is an equation for the LLR for the second bit, Equation 10 is an equation of calculating the LLR for the third bit, and Equation 11 is an equation of calculating the LLR for the fourth bit.

$$LLR(b_1) = \quad \text{[Equation 8]}$$
$$\begin{cases} (\tilde{x}_I - (3))^2 - (\tilde{x}_I - (-1))^2 = -8\tilde{x}_I + 8, & \tilde{x}_I > 2 \\ (\tilde{x}_I - (1))^2 - (\tilde{x}_I - (-1))^2 = -4\tilde{x}_I, & 2 > \tilde{x}_I > 0 \\ (\tilde{x}_I - 1)^2 - (\tilde{x}_I - (-1))^2 = -4\tilde{x}_I, & 0 > \tilde{x}_I > -2 \\ (\tilde{x}_I - 1)^2 - (\tilde{x}_I - (-3))^2 = -8\tilde{x}_I - 8, & -2 > \tilde{x}_I \end{cases}$$

$$LLR(b_2) = \quad \text{[Equation 9]}$$
$$\begin{cases} (\tilde{x}_I - 3)^2 - (\tilde{x}_I - 1)^2 = -4\tilde{x}_I + 8, & \tilde{x}_I > 2 \\ (\tilde{x}_I - 3)^2 - (\tilde{x}_I - 1)^2 = -4\tilde{x}_I + 8, & 2 > \tilde{x}_I > 0 \\ (\tilde{x}_I - (-3))^2 - (\tilde{x}_I - (-1))^2 = 4\tilde{x}_I + 8, & 0 > \tilde{x}_I > -2 \\ (\tilde{x}_I - (-3))^2 - (\tilde{x}_I - (-1))^2 = 4\tilde{x}_I + 8, & -2 > \tilde{x}_I \end{cases}$$

$$LLR(b_3) = \quad \text{[Equation 10]}$$
$$\begin{cases} (\tilde{x}_R - (-1))^2 - (\tilde{x}_R - (3))^2 = 8\tilde{x}_R - 8, & \tilde{x}_R > 2 \\ (\tilde{x}_R - (-1))^2 - (\tilde{x}_R - (1))^2 = 4\tilde{x}_R, & 2 > \tilde{x}_R > 0 \\ (\tilde{x}_R - (-1))^2 - (\tilde{x}_R - 1)^2 = 4\tilde{x}_R, & 0 > \tilde{x}_R > -2 \\ (\tilde{x}_R - (-3))^2 - (\tilde{x}_R - 1)^2 = 8\tilde{x}_R + 8 & -2 > \tilde{x}_R \end{cases}$$

$$LLR(b_4) = \quad \text{[Equation 11]}$$
$$\begin{cases} (\tilde{x}_R - 3)^2 - (\tilde{x}_R - 1)^2 = -4\tilde{x}_R + 8, & \tilde{x}_R > 2 \\ (\tilde{x}_R - 3)^2 - (\tilde{x}_R - 1)^2 = -4\tilde{x}_R + 8, & 2 > \tilde{x}_R > 0 \\ (\tilde{x}_R - (-3))^2 - (\tilde{x}_R - (-1))^2 = 4\tilde{x}_R + 8, & 0 > \tilde{x}_R > -2 \\ (\tilde{x}_R - (-3))^2 - (\tilde{x}_R - (-1))^2 = 4\tilde{x}_R + 8, & -2 > \tilde{x}_R \end{cases}$$

Hereinafter, a method of calculating an MMSE based R-LLR according to the exemplary embodiment of the present invention has been proposed. The calculation of the MMSE based R-LLR proposed in the exemplary embodiment of the present invention defines the reciprocity of the MMSE solution for each stream and uses the fact that only the few transmit candidate vectors including a maximum likelihood (ML) solution achieving the optimal performance is reciprocal when the transmit probabilities of all the transmit symbols are the same. Therefore, the reliability of the MMSE based LLR calculation can be improved. The method of calculating R-LLR proposed by the exemplary embodiment of the present invention determines the LLR of the symbols of the MMSE solution not satisfying the reciprocity as 0 by using the reciprocity information when the SINR information for each stream is not available or the SINRs for each stream are the same. Therefore, it is possible to prevent the LLR having the high erroneous probability from being used for the channel decoding and to improve the reliability of the LLR calculation. Further, when the SINR information for each stream is available or the SINRs for each stream are different, a priori term removed under the assumption that the transmit probabilities of all the transmit symbols are the same is calculated using the reciprocal information. Therefore, the reliability of the LLR calculation can be increased.

First, the reciprocity is defined. When the channel H and the receive signal vector y are given, if the two-dimensional complex vector $x \in \Omega 2$ satisfies Equation 12, the vector x may be defined as having the reciprocity.

$$\begin{bmatrix} x_1 \\ x_2 \end{bmatrix} = \begin{bmatrix} Q\left(\frac{h_1^H}{\|h_1\|^2}(y - h_2 x_2)\right) \\ Q\left(\frac{h_2^H}{\|h_2\|^2}(y - h_1 x_1)\right) \end{bmatrix} \quad \text{[Equation 12]}$$

Function Q(•) represents a slicing function defined by Equation 13.

$$Q(\hat{x}) = \arg\min_{x \in \Omega} \left| x - \hat{x} \right| \quad \text{[Equation 13]}$$

Figure 4:
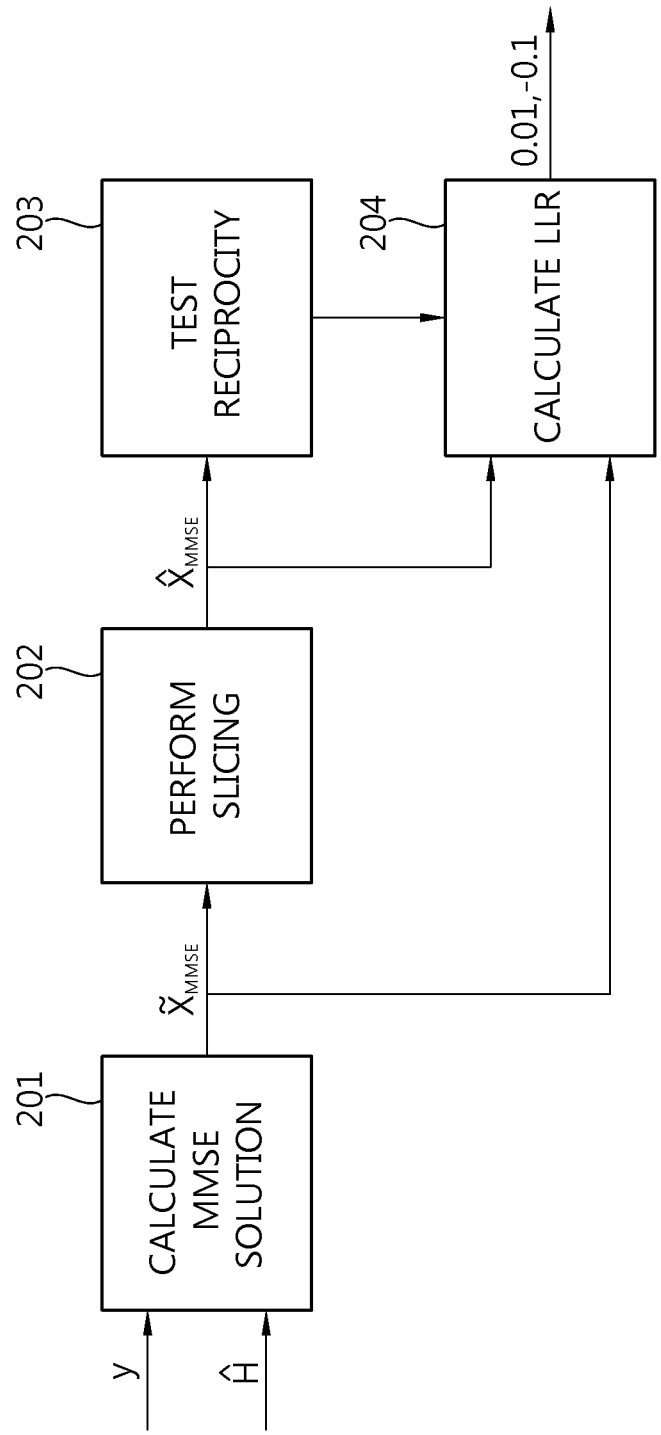
FIG. 4 shows experimental results showing transmit probabilities of transmit symbols according to whether reciprocity of MMSE solution is established.

FIG. 4 shows experimental results showing transmit probabilities of transmit symbols according to whether reciprocity of MMSE solution is established or not. The simulation experiment environment is shown in Table 1.

TABLE 1

| | |
|---|---|
| System Model | 2x2 MIMO System (Spatial Multiplexing) |
| Channel Model | IID(Independent and Identically Distributed) Rayleigh fading channel (8 independent 2x2 channels in a codeword) |
| Channel Estimation | Ideal CSI at Rx |
| Modulation Scheme | 16 QAM |

Referring to FIG. 4, if the $\hat{x}_{MMSE}$ that is the sliced MMSE solution has reciprocity, when the SNR is 0 dB, the transmit probabilities of all the transmit symbols are the same as 1/16. However, it can be appreciated that as the SNR is increased, the transmit probability can be exponentially increased. When the SNR is 20 dB or more, the transmit probability exceeds 0.95, and the transmit probability is approximately converged to 1. On the other hand, if the $\hat{x}_{MMSE}$ has no reciprocity, when the SNR is 0 dB, the transmit probability of the transmit symbol is lower than 1/16 and the transmit probability is not greatly increased even when the SNR is increased. As a result, it can be appreciated that the transmit probability is approximately converged to 0. That is, when the reciprocity of the MMSE solution is established, it can be appreciated that the LLR has the high reliability.

When the SINR information for each stream cannot be used or the SINRs for each stream are the same, the method of calculating R-LLR will be described. The method of calculating R-LLR proposed determines that the estimated transmit symbol statistically has the high reliability when the reciprocity is established based on the fact that only the few solutions including the ML solution are established to calculate the LLR, thereby detecting the transmit signal and determines that the estimated transmit symbol statistically has low reliability when the reciprocity is not established, thereby determining the LLR as 0.

Figure 5:
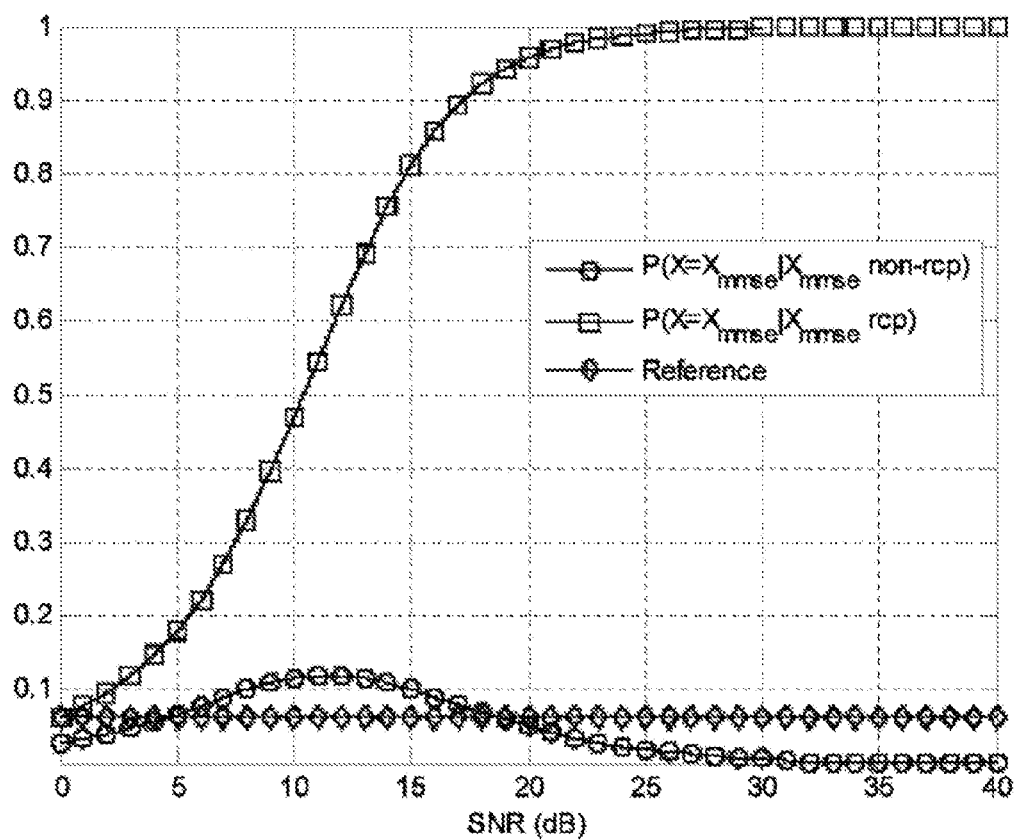
FIG. 5 shows an example of a block diagram showing a process of calculating R-LLR by an MMSE based R-LLR calculator.

FIG. 5 shows an example of a block diagram showing a process of calculating R-LLR by an MMSE based R-LLR calculator.

At S201, the MMSE based R-LLR calculator estimates the transmit symbols by calculating the MMSE solution based on the receive signal vector and the estimated channel gain matrix. At S202, the MMSE based R-LLR calculator performs the slicing on the estimated transmit symbol. At S203, the MMSE based R-LLR calculator tests the reciprocity of the sliced transmit symbol. At S204, the MMSE-based R-LLR calculator calculates the LLR based on the estimated transmit symbol, the sliced transmit symbol, and the establishment or not of the reciprocity. In this case, the LLR of the symbols of the MMSE solution not satisfying the reciprocity is determined as 0 and the LLR of the symbols of the MMSE solution satisfying the reciprocity is calculated by the above-mentioned method.

Representatively, the ML solution satisfies the reciprocity. The ML solution may be defined by the solution satisfying Equation 14.

$$\min_{x \in C^2} \| y - Hx \| = \min_{x_j \in C} \| y - h_i x_{i,ML} - h_j x_j \| \quad \text{[Equation 14]}$$

In addition, the unit vector may be defined as the following Equation 15.

$$\xi_j = \frac{h_j}{\| h_j \|} \quad \text{[Equation 15]}$$

Equation 16 may be represented by the above Equation 15.

$$y - h_i x_{i,ML} = \alpha \xi_j + \beta \xi_j^\perp \quad \text{[Equation 16]}$$

In Equation 16, $\alpha = \xi_j^H (y - h_i x_{i,ML})$.

$$\beta = \| y - h_i x_i - \alpha \xi_j \|, \; \xi_j^\perp = \frac{y - h_i x_i - \alpha \xi_j}{\beta}.$$

When Equation 15 and Equation 16 are substituted into Equation 14, an object function of the right of Equation 14 may be represented by Equation 17.

$$\| y - h_i x_{i,ML} - h_j x_j \|^2 = \| \alpha \xi_j + \beta \xi_j^\perp - \| h_j \| x_j \xi_j \|^2 \quad \text{[Equation 17]}$$
$$= \| (\alpha - x_j \| h_j \|) \xi_j + \beta \xi_j^\perp \|^2$$
$$= |\alpha - x_j \| h_j \| |^2 + |\beta|^2$$

In Equation 17, it can be appreciated that $|\beta|$ is a constant for the given regardless of $x_j$. Therefore, instead of the object function of the right of Equation 14, the solution satisfying $|\alpha - x_j \| h_j \||$ becomes the ML solution.

Meanwhile, $|\alpha - x_j \| h_j \||$ may be represented by Equation 18.

$$|\alpha - x_j \| h_j \|| = \left| \frac{h_j^H}{\| h_j \|^2} (y - h_i x_{i,ML}) - x_j \right| \quad \text{[Equation 18]}$$

Equation 19 may be obtained according to the definition of Equation 18 and the slicing function.

$$x_{j,ML} = Q\left( \frac{h_j^H}{\| h_j \|^2} (y - h_i x_{i,ML}) \right) \quad \text{[Equation 19]}$$

In Equation 19, $h_i = [h_{1i} \; h_{2i} \ldots h_{n_R i}]^T (i \in I)$ represents the i-th column of the channel gain matrix H and Q(•) is the slicing function. Referring to Equation 19, it can be appreciated that the ML solution of Equation 19 satisfies the form defined in Equation 12. That is, it can be appreciated that the ML solution satisfies the reciprocity like Equation 20.

$$x_{ML} = \begin{bmatrix} x_{1,ML} \\ x_{2,ML} \end{bmatrix} = \begin{bmatrix} Q\left( \frac{h_1^H}{\| h_1 \|^2} (y - h_2 x_{2,ML}) \right) \\ Q\left( \frac{h_2^H}{\| h_2 \|^2} (y - h_1 x_{1,ML}) \right) \end{bmatrix} \quad \text{[Equation 20]}$$

Table 2 shows an example of a pseudo code representing the process of calculating R-LLR of FIG. 5.

TABLE 2

$\hat{x}_{MMSE} = Q(\tilde{x}_{MMSE})$ if $\begin{bmatrix} \hat{x}_{1,MMSE} \\ \hat{x}_{2,MMSE} \end{bmatrix} == \begin{bmatrix} Q\left( \frac{h_1^H}{\|h_1\|^2} (y - h_2 \hat{x}_{2,MMSE}) \right) \\ Q\left( \frac{h_2^H}{\|h_2\|^2} (y - h_1 \hat{x}_{1,MMSE}) \right) \end{bmatrix}$, conventional LLR w/o SINR using $\tilde{x}_{MMSE}$ else LLR = 00000000

When the SINR information for each stream can be used or the SINRs for each stream are not the same, the method of calculating R-LLR will be described below. The method of calculating R-LLR proposed calculates the priori terms omitted under the assumption that the transmit probabilities of all the transmit symbols are the same by the results obtained through the simulation experiment and uses the calculated results. The method of calculating R-LLR proposed is effective in the method of calculating LLR considering the SINR represented by Equation 6.

Figure 6:
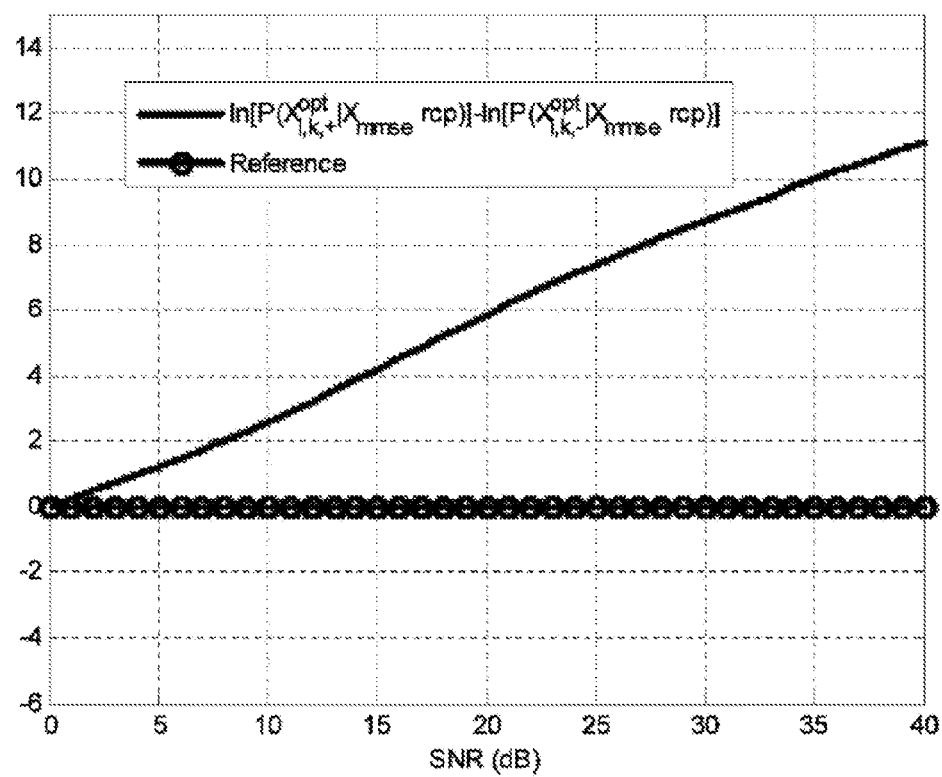
FIG. 6 shows another example of a block diagram showing a process of calculating R-LLR by an MMSE based R-LLR calculator.

FIG. 6 shows another example of a block diagram showing a process of calculating R-LLR by an MMSE based R-LLR calculator.

At 5205, the MMSE based R-LLR calculator estimates the transmit symbols by calculating the MMSE solution based on the receive signal vector and the estimated channel gain matrix. At S206, the MMSE based R-LLR calculator performs the slicing on the estimated transmit symbol. At S207, the MMSE based R-LLR calculator tests the reciprocity of the sliced transmit symbol. At S208, the MMSE-based R-LLR calculator calculates the LLR based on the estimated transmit symbol and the sliced transmit symbol. At S209, the MMSE based R-LLR calculator calculates the R-LLR in which the priori term is added to the LLR based on the calculated LLR and whether the reciprocity is established. In this case, the LLR of the symbols of the MMSE solution satisfying the reciprocity becomes a value obtained by adding the priori term to the LLR calculated by the above-mentioned method.

The R-LLR in which the LLR is added to the priori term may be represented by Equation 21.

$$LLR(b_{k,1}) \approx \ln \frac{\max_{x_i \in S_k^+} p(\tilde{x}_{1,MMSE} | x_i) p(x_i)}{\max_{x_j \in S_k^-} p(\tilde{x}_{1,MMSE} | x_j) p(x_j)}$$

$$= \frac{1}{2\sigma_1^2}(|\tilde{x}_{1,MMSE} - x_{1,k,-}^{opt}|^2 - |\tilde{x}_{1,MMSE} - x_{1,k,+}^{opt}|^2) + \ln\frac{p(x_{1,k,+}^{opt})}{p(x_{1,k,-}^{opt})}$$

[Equation 21]

In Equation 21, the priori term may be represented by Equation 22.

$$\ln\frac{p(x_{1,k,+}^{opt})}{p(x_{1,k,-}^{opt})} = \begin{cases} \ln p(x_{1,k,+}^{opt} | \hat{x}_{MMSE} \ rcp) - \ln\frac{1 - p(x_{i,k,+}^{opt} | \hat{x}_{MMSE} \ rcp)}{|\Omega| - 1}, & \text{if } \hat{x}_{MMSE} \text{ is reciprocal} \\ 0, & \text{else} \end{cases}$$

[Equation 22]

Figure 7:
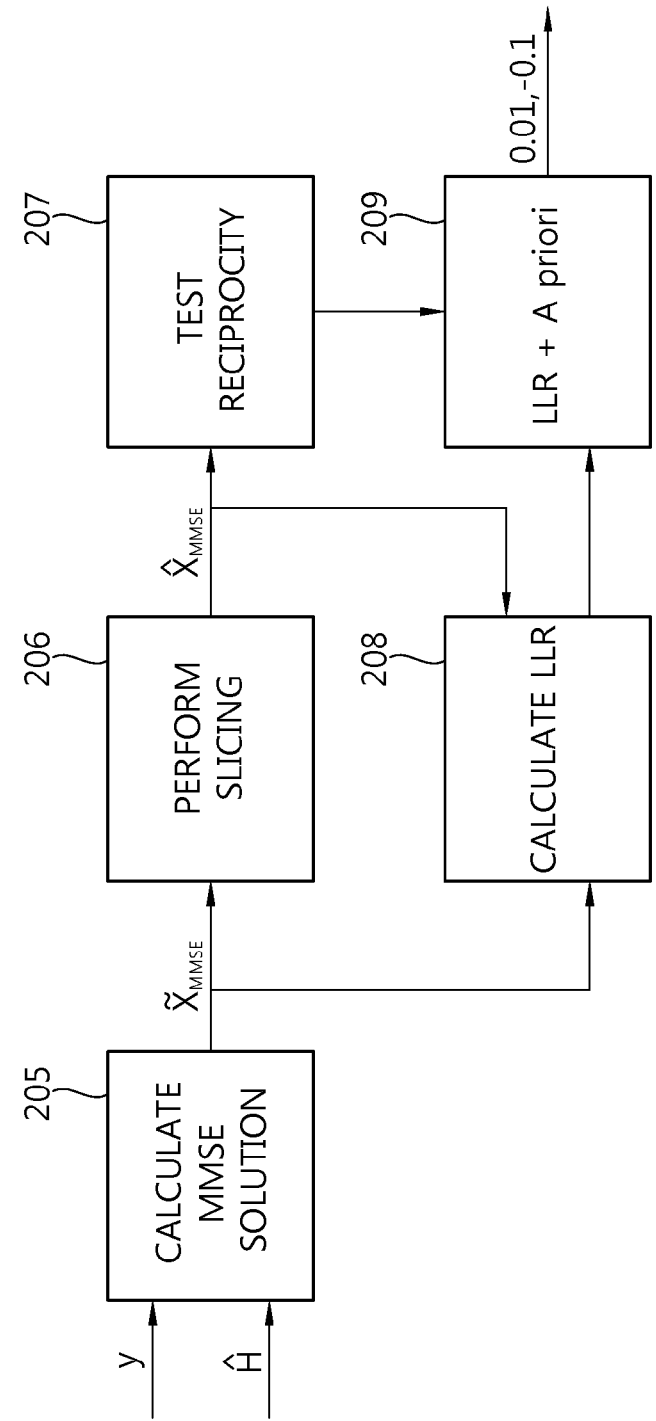
FIG. 7 shows results obtained by calculating priori terms through a simulation experiment according to the method of calculating R-LLR proposed.

FIG. 7 shows results obtained by calculating priori terms through a simulation experiment according to the method of calculating R-LLR proposed. The graph of FIG. 7 may be considered as a straight line having a slope of about ¼. That is, Equation 22 may approximate like Equation 23.

$$\ln\frac{p(x_{i,k,+}^{opt})}{p(x_{i,k,-}^{opt})} \approx \begin{cases} \frac{1}{4} SNR_{dB}, & \text{if reciprocal} \\ 0, & \text{else} \end{cases}$$

[Equation 23]

Table 3 shows an example of a pseudo code representing the process of calculating R-LLR of FIG. 6.

TABLE 3

$\hat{x}_{MMSE} = Q(\tilde{x}_{MMSE})$ if $\begin{bmatrix} \hat{x}_{1,MMSE} \\ \hat{x}_{2,MMSE} \end{bmatrix} == \begin{bmatrix} Q\left(\frac{h_1^H}{\|h_1\|^2}(y - h_2\hat{x}_{2,MMSE})\right) \\ Q\left(\frac{h_2^H}{\|h_2\|^2}(y - h_1\hat{x}_{1,MMSE})\right) \end{bmatrix}$, $LLR(b_k) = \frac{1}{2\sigma_1^2}\left(|\tilde{x}_{1,MMSE} - x_{1,k,-}^{opt}|^2 - |\tilde{x}_{1,MMSE} - x_{1,k,+}^{opt}|^2\right) + \ln\frac{p(x_{1,k,+}^{opt})}{p(x_{1,k,-}^{opt})}$ else $LLR(b_k) = \frac{1}{2\sigma_1^2}\left(|\tilde{x}_{1,MMSE} - x_{1,k,-}^{opt}|^2 - |\tilde{x}_{1,MMSE} - x_{1,k,+}^{opt}|^2\right)$ However, the performance of the method of calculating R-LLR proposed through the simulation experiment compares with the performance of the method of calculating LLR according to the related art. The simulation experiment environment is shown in Table 4.

TABLE 4

| System Model | 2x2 MIMO System (Spatial multiplexing) |
| --- | --- |
| Channel Model | IID(Independent and Identically Distributed) Rayleigh fading channel (8 independent 2x2 channels in a codeword) |
| Channel Estimation | Ideal CSI at Rx |
| Modulation Sheme | 16 QAM |
| Frame Size | 2568 bits (648 symbol time * 2 streams * 4 bits * ½ coding rate - 6 CC tail) |
| Error Correction Encoder | Convolutional Coding (K = 7, rate = ½) |
| Interleaving | Bit interleaved coded modulation (BICM) |

Figure 8:
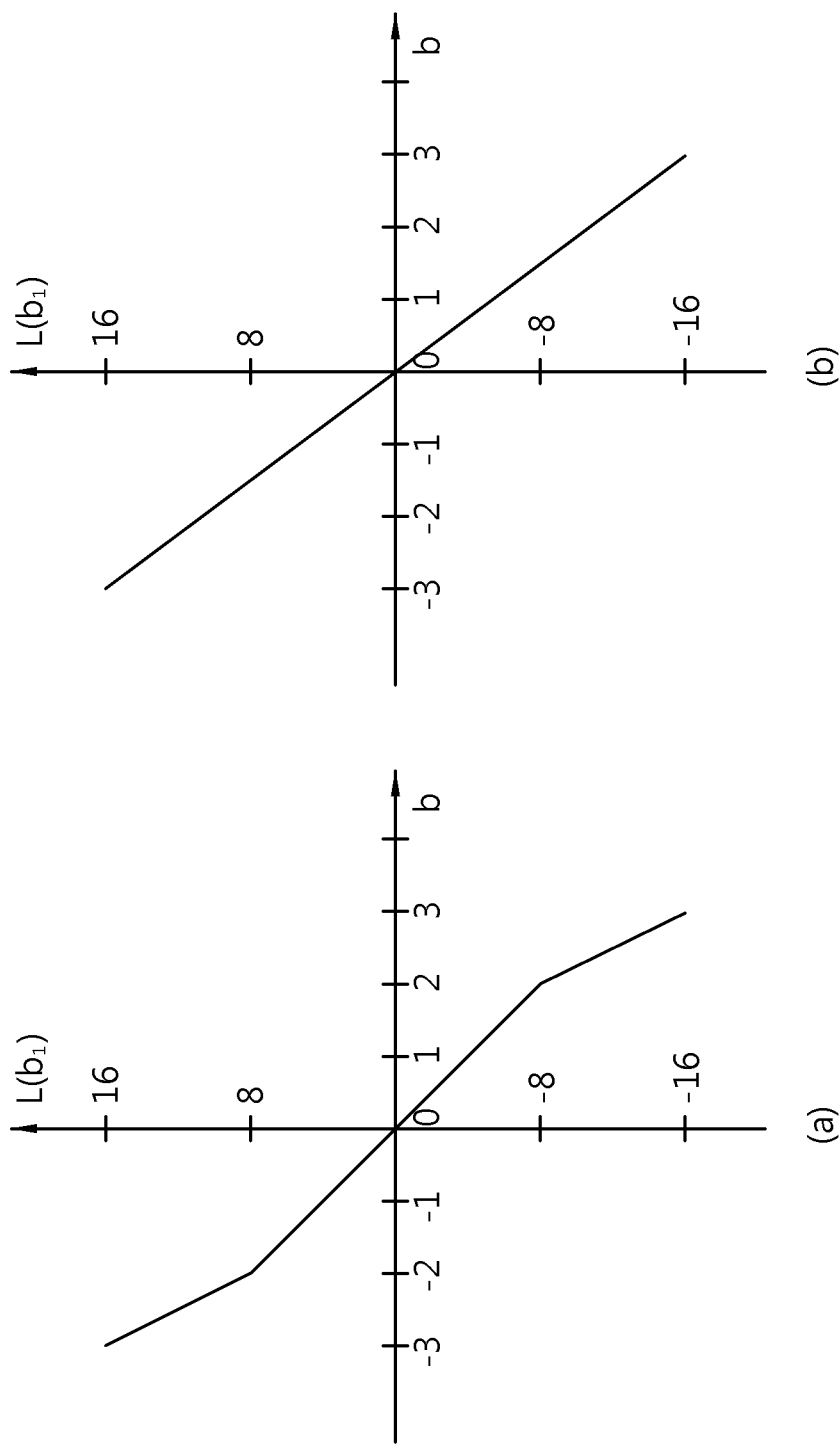
FIGS. 8 and 9 are diagrams showing a simple LLR calculation of a first bit and a third bit at the time of calculating the LLR in the simulation experiment.
Figure 9:
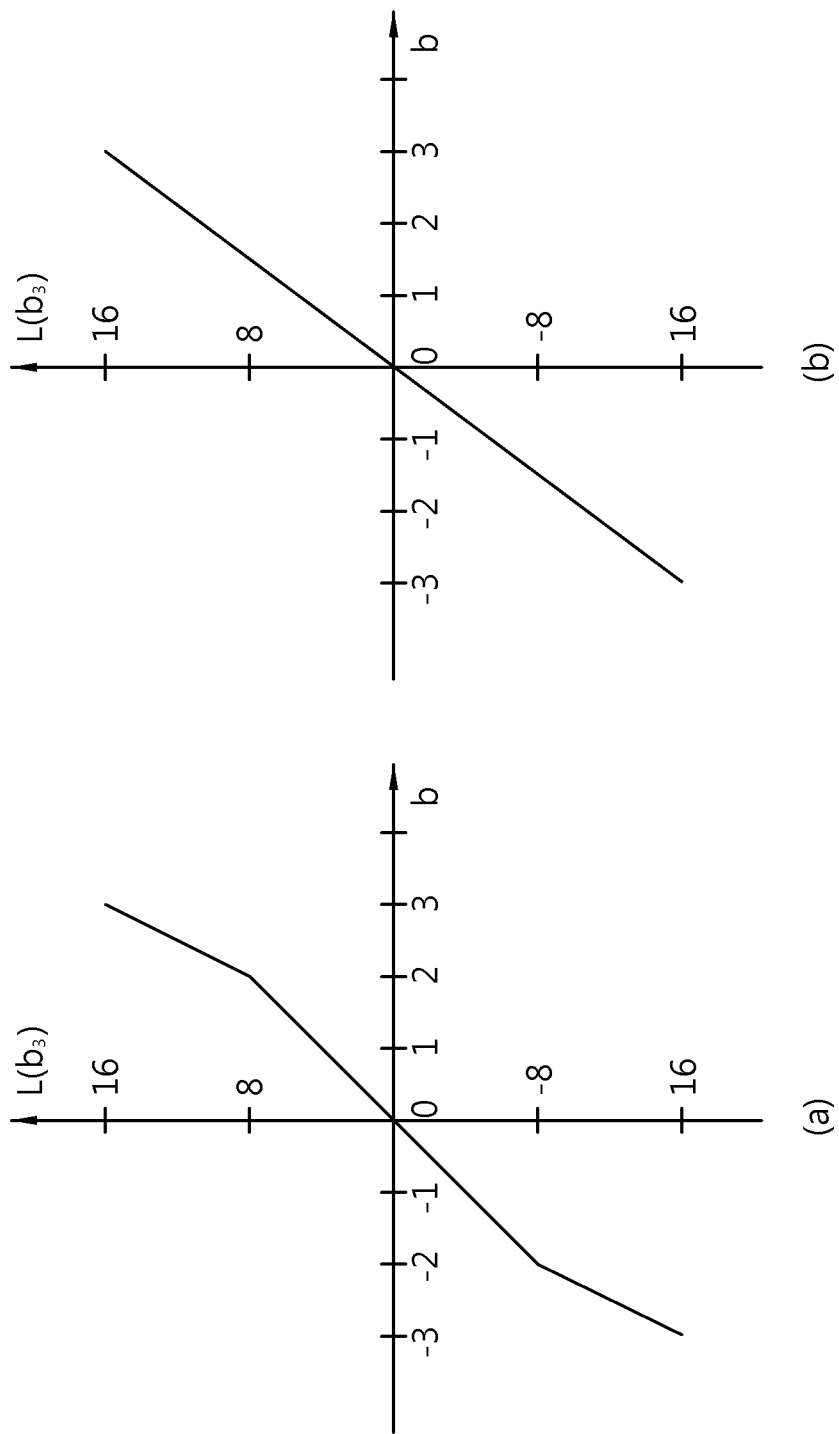

FIGS. 8 and 9 are diagrams showing a simple LLR calculation of a first bit and a third bit at the time of calculating the LLR in the simulation experiment. FIG. 8A shows general LLR calculation for the first bit, FIG. 8B shows a simplified LLR calculation for the first bit, FIG. 9A shows general LLR calculation for the third bit, and FIG. 9B shows a simplified LLR calculation for the third bit.

Figure 10:
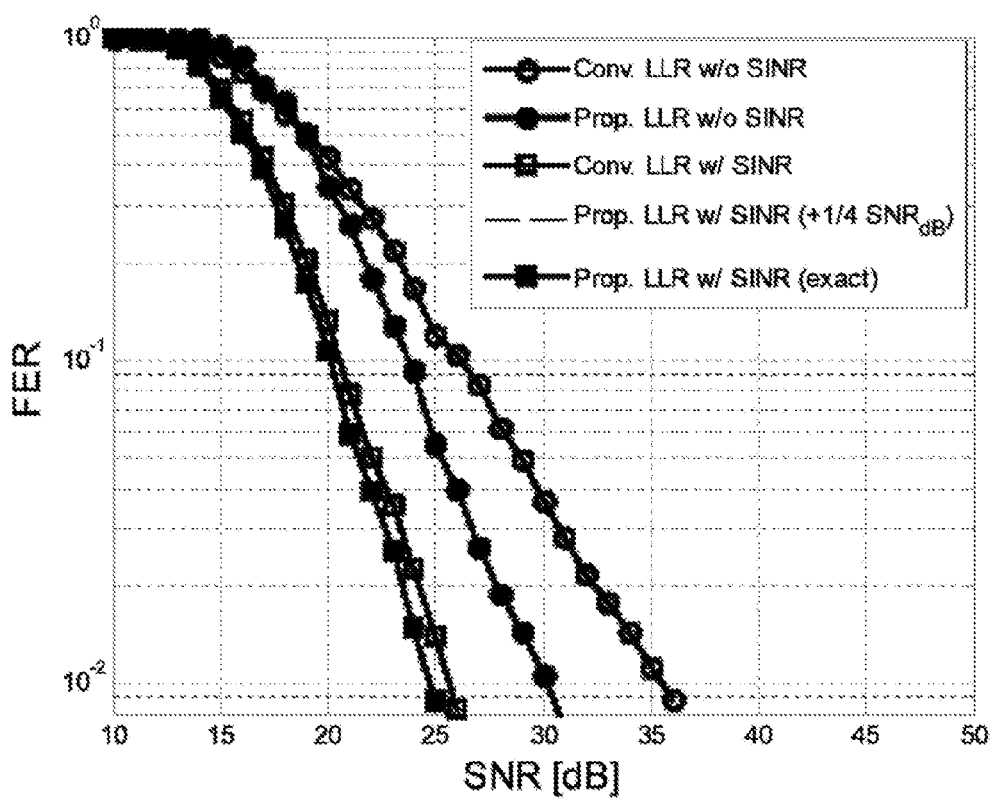
FIG. 10 is a graph showing performance of the method of calculating R-LLR proposed.

FIG. 10 is a graph showing performance of the method of calculating R-LLR proposed. Referring to FIG. 10, when the SINR information for each stream cannot be used or the SINRs for each stream are the same, it can be appreciated that the method for calculating R-LLR proposed has a performance gain of about 5.5 dB as compared with the method of calculating LLR according to the related art, when the forward error rate (PER) is 10-2. Due to the diversity order, the higher the SNR, the higher the performance gain can be obtained. In addition, when the SINR information for each stream can be used or the SINRs for each stream are not the same, it can be appreciated that the method of calculating R-LLR proposed has the performance gain of about 1 dB at the FER as compared with the method of calculating LLR according to the related art. Due to the diversity order, it is predicted that the higher the SNR, the higher the performance gain can be obtained.

The exemplary embodiments of the present invention may be implemented by hardware, software, or a combination thereof. The hardware may be implemented by an application specific integrated circuit (ASIC), digital signal processing (DSP), a programmable logic device (PLD), a field programmable gate array (FPGA), a processor, a controller, a microprocessor, other electronic units, or a combination thereof, all of which are designed so as to perform the above-mentioned functions. The software may be implemented by a module performing the above-mentioned functions. The software may be stored in a memory unit and may be executed by a processor. The memory unit or a processor may adopt various units well-known to those skilled in the art.

The exemplary embodiments of the present invention can improve the performance of the receiver in the MIMO system by calculating the MMSE based reciprocal log likelihood ration (R-LLR) based on the reciprocity.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A receiver in a multiple-input multiple-output (MIMO) system, the receiver comprising:
   a channel estimator configured for estimating a channel based on a receive signal;
   a minimum mean square error (MMSE) based reciprocal log likelihood ratio (R-LLR) calculator, coupled to the channel estimator, and configured for calculating an R-LLR based on the receive signal and the estimated channel; and
   a channel decoder, coupled to the MMSE based R-LLR calculator, and configured for decoding the channel and the receive signal based on the calculated R-LLR,
   wherein the R-LLR is calculated based on reciprocity, and
   wherein when SINR information for each stream is available or the SINRs for each stream are different, the MMSE based R-LLR calculator is configured for:
   estimating the transmit symbol by calculating the MMSE solution based on the receive signal and the estimated channel;
   performing slicing on the estimated transmit symbol;
   testing whether the reciprocity of the sliced transmit symbol is established or not;

$$\ln\frac{p(x_{1,k,+}^{opt})}{p(x_{1,k,-}^{opt})} = \begin{cases} \ln p(x_{1,k,+}^{opt} | \hat{x}_{MMSE}\ rcp) - \ln\frac{1 - p(x_{1,k,+}^{opt} | \hat{x}_{MMSE}\ rcp)}{|\Omega| - 1}, & \text{if } \hat{x}_{MMSE} \text{ is reciprocal} \\ 0, & \text{else.} \end{cases}$$

calculating an LLR based on the estimated transmit symbol and the sliced transmit symbol; and
   calculating an R-LLR in which a priori term is added to the LLR, based on the calculated LLR and the establishment or not of the reciprocity.

2. The receiver of claim 1, wherein the reciprocity is established at the time of satisfying the following Equation:

$$\begin{bmatrix} x_1 \\ x_2 \end{bmatrix} = \begin{bmatrix} Q\left(\frac{h_1^H}{\|h_1\|^2}(y - h_2 x_2)\right) \\ Q\left(\frac{h_2^H}{\|h_2\|^2}(y - h_1 x_1)\right) \end{bmatrix},$$

where H represents a gain matrix of the channel, y represents a vector of the receive signal, and $x \in \Omega^2$ represents a two-dimensional complex vector, $\Omega$ represents a set of complex constellation points, and function $Q(\cdot)$ represents a slicing function defined by the following Equation $$Q(\hat{x}) = \arg\min_{x \in \Omega} |x - \hat{x}|.$$

3. The receiver of claim 1, wherein the R-LLR is calculated by the following Equation:

$$\begin{aligned} LLR(b_{k,1}) &\approx \ln\frac{\max_{x_i \in S_k^+} p(\tilde{x}_{1,MMSE} | x_i) p(x_i)}{\max_{x_j \in S_k^-} p(\tilde{x}_{1,MMSE} | x_j) p(x_j)} \\ &= \frac{1}{2\sigma_1^2}(|\tilde{x}_{1,MMSE} - x_{1,k,-}^{opt}|^2 - \\ &\quad |\tilde{x}_{1,MMSE} - x_{1,k,+}^{opt}|^2) + \ln\frac{p(x_{1,k,+}^{opt})}{p(x_{1,k,-}^{opt})}, \end{aligned}$$

where $b_{k,1}$ represents the k-th bit of a first stream, $S_k^+$ represents the symbol set of which the k-th bit is 1, $S_k^-$ represents the symbol set of which the k-th bit is 0, $\tilde{x}_{1,MMSE}$ represents an MMSE solution for the first stream, $x_i$ (i=1,2) represents a signal transmitted from an i-th transmit antenna, and $\sigma_1^2$ represents dispersion of circular symmetric Gaussian distribution representing a distribution of noise of the first stream $$x_{1,k,+}^{opt} = \arg\min_{x \in S_k^+}|\tilde{x}_{1,MMSE} - x|^2, x_{1,k,-}^{opt} = \arg\min_{x \in S_k^-}|\tilde{x}_{1,MMSE} - x|^2.$$

4. The receiver of claim 3, wherein the priori term is calculated by the following Equation based on the establishment or not of the reciprocity 5. The receiver of claim 3, wherein the priori term is calculated by the following Equation based on the establishment or not of the reciprocity $$\ln\frac{p(x_{i,k,+}^{opt})}{p(x_{i,k,-}^{opt})} \approx \begin{cases} \frac{1}{4}SNR_{dB}, & \text{if reciprocal} \\ 0, & \text{else.} \end{cases}$$

6. A receiver in a multiple-input multiple-output (MIMO) system, the receiver comprising:
   a channel estimator configured for estimating a channel based on a receive signal;
   a minimum mean square error (MMSE) based reciprocal log likelihood ratio (R-LLR) calculator, coupled to the channel estimator, and configured for calculating an R-LLR based on the receive signal and the estimated channel; and a channel decoder, coupled to the MMSE based R-LLR calculator, and configured for decoding the channel and the receive signal based on the calculated R-LLR;

wherein the R-LLR is calculated based on reciprocity, and wherein when signal to interference noise ratio information (SINR) for each stream is not available or the SINRs for each stream are the same, the MMSE based R-LLR calculator is configured for:

estimating transmit symbols by calculating an MMSE solution based on the receive signal and the estimated channel;

performing slicing on the estimated transmit symbol; and testing whether the reciprocity of the sliced transmit symbol is established or not.

7. The receiver of claim 6, wherein when the reciprocity is established, the MMSE based R-LLR calculator is configured for calculating an LLR based on the estimated transmit symbol, the sliced transmit symbol, and the establishment or not of the reciprocity.

8. The receiver of claim 7, wherein the MMSE solution is a most likelihood (ML) solution.

9. The receiver of claim 6, wherein when the reciprocity is not established, the MMSE based R-LLR calculator is configured for determining an LLR of the transmit symbol as 0.

10. A method of detecting, using a computing device to perform operations, a signal in a multi-input multiple-output (MIMO) system, the method comprising:

estimating a channel based on a receive signal;

calculating a reciprocal log likelihood ratio (R-LLR) based on the receive signal and the estimated channel; and decoding the channel and the receive signal based the calculated R-LLR, wherein the R-LLR is calculated based on reciprocity, and wherein when the SINR information for each stream is available or the SINRs for each stream are different, the calculating of the R-LLR includes:

estimating the transmit symbol by calculating the MMSE solution based on the receive signal and the estimated channel;

performing slicing on the estimated transmit symbol;

testing whether the reciprocity of the sliced transmit symbol is established or not;

calculating an LLR based on the estimated transmit symbol and the sliced transmit symbol; and calculating an R-LLR in which a priori term is added to the LLR, based on the calculated LLR and the establishment or not of the reciprocity.

11. The method of claim 10, wherein the reciprocity is established at the time of satisfying the following Equation:

$$\begin{bmatrix} x_1 \\ x_2 \end{bmatrix} = \begin{bmatrix} Q\left(\dfrac{h_1^H}{\|h_1\|^2}(y - h_2 x_2)\right) \\ Q\left(\dfrac{h_2^H}{\|h_2\|^2}(y - h_1 x_1)\right) \end{bmatrix},$$

where H represents a gain matrix of the channel, y represents a vector of the receive signal, and $x \in \Omega^2$ represents a two-dimensional complex vector, $\Omega$ represents a set of complex constellation points, and function $Q(\bullet)$ represents a slicing function defined by the following Equation $$Q(\hat{x}) = \arg \min_{x \in \Omega} |x - \hat{x}|.$$

12. A method of detecting, using a computing device to perform operations, a signal in a multi-input multiple-output (MIMO) system, the method comprising:

estimating a channel based on a receive signal;

calculating a reciprocal log likelihood ratio (R-LLR) based on the receive signal and the estimated channel; and decoding the channel and the receive signal based the calculated R-LLR, wherein the R-LLR is calculated based on reciprocity; and wherein when signal to interference noise ratio information (SINR) for each stream is not available or the SINRs for each stream are the same, the calculating of the R-LLR includes:

estimating transmit symbols by calculating an MMSE solution based on the receive signal and the estimated channel;

performing slicing on the estimated transmit symbol; and testing whether the reciprocity of the sliced transmit symbol is established or not.

13. The method of claim 12, further comprising calculating an LLR based on the estimated transmit symbol, the sliced transmit symbol, and the establishment or not of the reciprocity, when the reciprocity is established.

14. The method of claim 12, further comprising determining an LLR of the transmit symbol as 0, when the reciprocity is not established.

* * * * *